United States Patent [19]
Hosoi

[11] Patent Number: 5,991,472
[45] Date of Patent: Nov. 23, 1999

[54] OPTICAL WAVELENGTH FILTER

[75] Inventor: Toru Hosoi, Tokyo, Japan

[73] Assignee: NEC Corporation, Tokyo, Japan

[21] Appl. No.: 08/991,541

[22] Filed: Dec. 16, 1997

[30] Foreign Application Priority Data

Dec. 19, 1996 [JP] Japan ................................. 8-339547

[51] Int. Cl.$^6$ .................................................. G02B 6/14
[52] U.S. Cl. ...................................... 385/11; 385/7
[58] Field of Search .......................... 385/7, 11; 359/308

[56] References Cited

U.S. PATENT DOCUMENTS

| | | | |
|---|---|---|---|
| 4,532,632 | 7/1985 | Yamashita et al. | 385/7 |
| 5,002,349 | 3/1991 | Cheung et al. | 385/1 |
| 5,677,971 | 10/1997 | Okayama et al. | 385/11 |

FOREIGN PATENT DOCUMENTS 5-323248  12/1993  Japan .

OTHER PUBLICATIONS

Arjun Kar–Roy et al., *IEEE Photonics Technology Letters*, vol. 4, No. 10, Low–Sidelobe Weighted–Coupled Integrated Acoustooptic Tunable Filter Using Focused Surface Acoustic Waves, Oct. 1992, pp. 1132–1135.

*Primary Examiner*—John D. Lee
*Assistant Examiner*—Michael J. Stahl
*Attorney, Agent, or Firm*—Young & Thompson

[57] ABSTRACT

The present invention provides an optical wavelength filter, in which the light of a particular wavelength in a first linear polarization inputted from the input end of an optical waveguide formed near the surface of a substrate is transformed into a second linear polarization perpendicular to the first linear polarization by means of an elastic surface wave generated by a reed screen type electrode composed of a plurality of finger electrode portions formed on the input end side of the optical waveguide, and said plurality of finger electrode portions formed in a circular arc shape are disposed each having an angle for correcting the deflection of the propagation direction of the elastic surface wave so that the elastic surface wave converges at a desired position.

7 Claims, 5 Drawing Sheets

OPTICAL WAVELENGTH FILTER

BACKGROUND OF THE INVENTION

1. Field of the Invention

The present invention relates to an optical wavelength filter for taking out the light of a particular wavelength from input light, more particularly to an optical wavelength filter utilizing the acoustooptic effect.

2. Description of the Related Art

When an acoustic wave and light are propagated through a solid, as the propagation of the acoustic wave proceeds, a refractive index of an optical waveguide through which the light is propagated changes periodically, and the light is polarization transformed due to a periodical change of the refractive index. Since wavelength dispersion takes place during polarization transform, the light of a wavelength which satisfies the phase matching condition is strongly transformed by polarization transform. The optical wavelength filter which uses this acoustooptic effect has a characteristic such that it is capable of high-speed motion resulting in a wide variable range of tuning and hence it can select a variety of channels. The above optical wavelength filter also has a characteristic that it can concurrently select the light of a plurality of wavelengths.

As an example of the optical wavelength filter which uses the conventional acoustooptic effect, an optical wavelength filter of a structure shown in FIG. 1 is proposed.

The conventional optical wavelength filter shown in FIG. 1 is described in the technical digest "Low-sidelobe integrated acoustooptic tunable filter surface acoustic waves", Topical Meeting on Integrated Photonics Research, Apr.13–15, 1992.

In FIG. 1, near the surface of substrate 81 made of a lithium niobate (LiNbO$_3$) crystal of Y axis cut X axis propagation, titanium-doped optical waveguide 82 is formed. On substrate 81, first acoustic wave absorber 85$_1$ for absorbing an elastic surface wave is mounted at the input end side of optical waveguide 82, and elastic surface wave excitation electrode 83 for generating the elastic surface wave is formed at the output side of first acoustic wave absorber 85$_1$. Further, a second acoustic wave absorber 85$_2$ for absorbing the acoustic wave which is the elastic surface wave is mounted at the output end side of optical waveguide 82.

With a structure like this, interaction area 84 in which the acoustic wave acts on the light is interposed between first acoustic wave absorber 85$_1$ and second acoustic wave absorber 85$_2$, and in which a periodical refractive index change of the light is produced due to periodical grating caused by the elastic surface wave excited by elastic surface wave excitation electrode 83.

Now, if first linear polarization (hereinafter referred to as TE polarization) composed of the light of a plurality of wavelength ($\lambda_0$ to $\lambda_n$) having an electric field component horizontal to substrate 81 is inputted from the input end, the light of a particular wavelength ($\lambda_1$) satisfying the phase matching condition having an electric field component perpendicular to substrate 81 is transformed to a second linear polarization (hereinafter called as TM polarization) under the influence of a periodical refractive index change of interaction area 84.

By passing the light outputted from the optical waveguide 82 through a polarization separation element, not shown, only the light of wavelength ($\lambda_1$) transformed to TM polarization is outputted from the polarization separation element. According to this effect, it serves as an optical wavelength filter which passes light of a particular wavelength.

A weighting method applied for controlling the acoustooptic effect has been known as a method for decreasing a side-lobe level of the output of the optical wavelength filter.

This is a method for controlling a high degree mode which is generated when the acoustic wave acts on the light, by changing a width or a space of each finger electrode portion which constitutes elastic surface wave excitation electrode 83 composed of a reed screen type electrode and arranging the finger electrode portions so that the energy distribution of the elastic surface wave agrees with a predetermined function (for example, a Hamming's function) with reference to the position thereof.

With the optical wavelength filter shown in FIG. 1, the weighting method is applied in such a way that elastic surface wave excitation electrode 83 is formed with a reed screen type electrode of a circular arc shape and by making the energy distribution of the elastic surface wave agree with a predetermined function by converging the elastic surface wave within interaction area 84.

In the conventional optical wavelength filter described above, although the elastic surface wave is converged by making the elastic surface wave excitation electrode into a simple circular arc form, this type of structure is limited to a case that a crystal, in which the direction of a normal line of a reed screen type electrode and the direction of propagation of the real elastic surface wave coincide with each other (there is no deflection in the propagation direction), for example, such as lithium niobate of Y axis cut X axis propagation is used as a substrate.

In case a crystal having deflection in the propagation direction of the elastic surface wave, for example, lithium niobate of X axis cut Y axis propagation having a larger electro-mechanical coupling coefficient is used as a substrate, it is impossible to converge the elastic surface waves at a desired position, and hence it has been unable to apply this structure to actual use.

SUMMARY OF THE INVENTION

Therefore, an object of the present invention is to provide an optical wavelength filter which decreases a side-lobe level of the outputted light, even when a crystal having deflection in the propagation direction of an elastic surface wave is used as a substrate.

In order to achieve the above object, the optical wavelength filter of the present invention is structured such that the light of a particular wavelength in a first linear polarization is transformed into another light in a second linear polarization, and comprises a substrate, an optical waveguide formed near a surface of the substrate, the optical waveguide having a first end to which the light in the first linear polarization inputs and a second end from which the light in the second linear polarization outputs, and a reed screen type electrode for generating an elastic surface wave composed of a plurality of finger electrode portions and formed on the first end side of the optical waveguide, wherein the plurality of finger electrode portions formed in a circular arc shape are disposed each having an angle for correcting the deflection of the propagation direction of said elastic surface wave so that said elastic surface wave converges at a desired position.

It is possible to construct the plurality of finger electrode portions with a plurality of unit finger electrode portions, each of the unit finger electrode portions having an angle for correcting the deflection of the propagation direction of the elastic surface wave being disposed at an equal distance from the desired position. Or, The plurality of finger electrode portions may be composed of unit finger electrode portions having an angle for correcting the deflection of the propagation direction of the elastic surface wave, each of the unit finger electrode portions being connected with the neighboring unit finger electrode portion without a difference in grade.

In the optical wavelength filter structured as above, by disposing the finger electrode portion of a reed screen type electrode, each finger electrode portion having an angle for correcting the deflection of the propagation direction of the elastic surface wave, the elastic surface wave excited by the reed screen type electrode converges at the desired position, and hence even when a crystal having deflection in the propagation direction of the elastic surface wave is used as a substrate, it is possible to make the energy distribution of the elastic surface wave agree with a predetermined function.

The above and other objects, features and advantages of the present invention will become apparent from the following description with reference to the accompanying drawings which illustrate examples of the present invention.

DETAILED DESCRIPTION OF THE PREFERRED EMBODIMENTS

The present invention will next be described with reference to the drawings.

Figure 2:
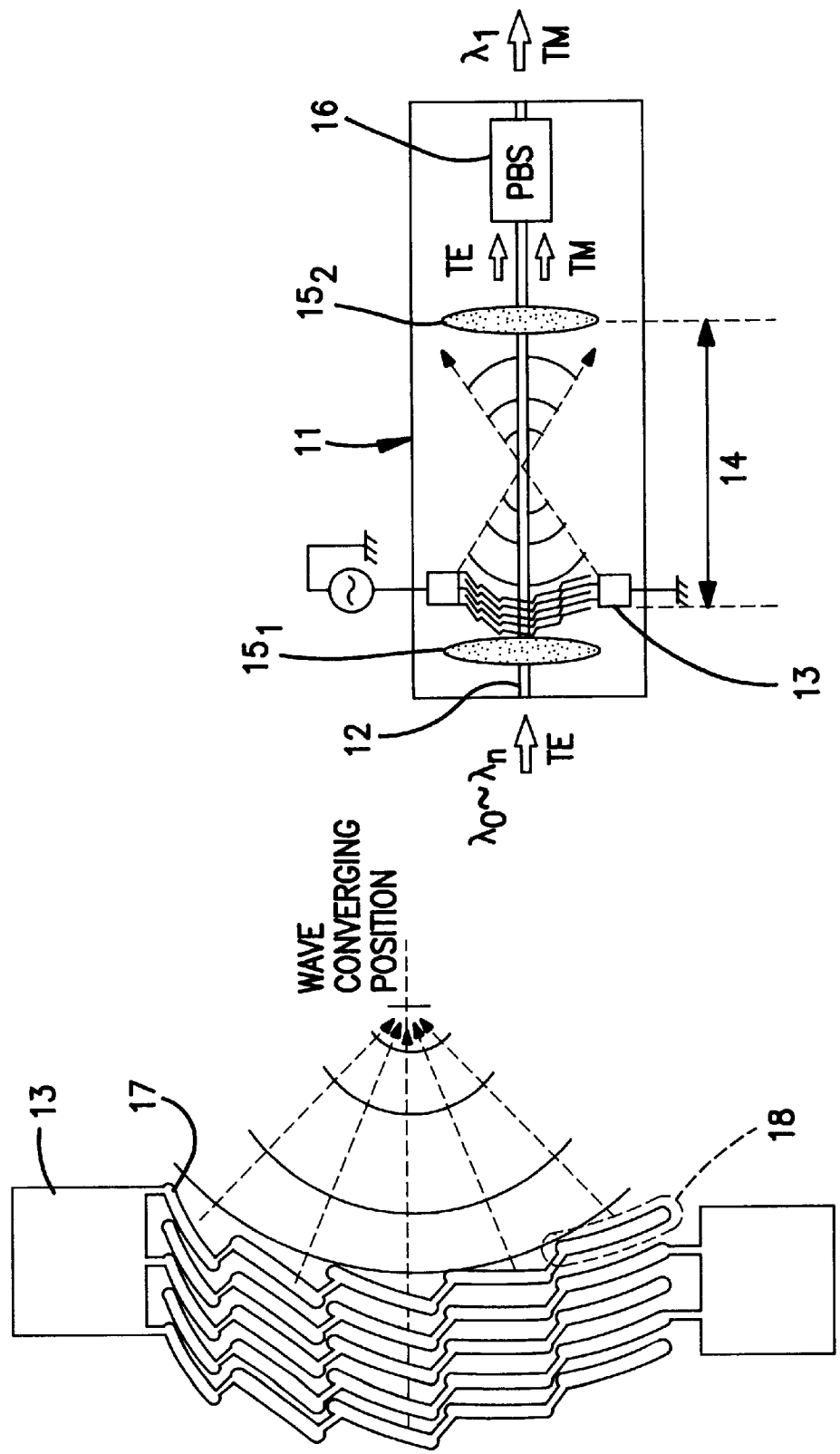
FIG. 2 is a plan showing a structure of a first embodiment of an optical wavelength filter of the present invention.

As shown in FIG. 2, titanium-doped optical waveguide 12 is formed near the surface of substrate 11 composed of a lithium niobate (LiNbO$_3$) crystal of X axis cut Y axis propagation. On substrate 11, first acoustic wave absorber 15$_1$ for absorbing an elastic surface wave is mounted at the input end side of optical waveguide 12, and elastic surface wave excitation electrode 13 for generating the elastic surface wave is formed at an output side of first acoustic wave absorber 15$_1$. Further, second acoustic wave absorber 15$_2$ for absorbing the elastic surface wave is mounted at a position across interaction area 14 in which the acoustic wave acts on the light being opposed to the position of the first acoustic wave absorber, and polarization separation element 16 for passing only the light of a particular wavelength ($\lambda_1$) transformed to TM polarization at interaction area 14 is mounted on the output side of second acoustic wave absorber 15$_2$.

Here, elastic surface wave excitation electrode 13 is composed of a reed screen type electrode and as shown in FIG. 2, each of the finger electrode portions 17 constituting the reed screen type electrode is divided into a plurality of unit finger electrode portions 18. Each of the unit finger electrode portions 18 are arranged so that it has, in addition to an inclination for disposing each of the electrode finger portions 17 into a circular arc shape, an angle for correcting the deflection of the propagation direction of the elastic surface wave to make the elastic surface wave converge at a desired position. Further, for each finger electrode portion 17, each of the unit finger electrode portions 18 are disposed so that the distance to the desired converging position of the elastic surface wave are the same.

Therefore, since the elastic surface wave excited by elastic surface wave excitation electrode 13 converges at the desired position, even when a crystal having the deflection in the propagation direction of the elastic surface wave is used as substrate 11, it is possible to make the energy distribution of the elastic surface wave agree with a predetermined function thereby decreasing the side-lobe level.

Also, since the lithium niobate crystal of X axis cut Y axis propagation used for substrate 11 of the present embodiment has an electro-mechanical coupling coefficient larger than that of the conventional lithium niobate crystal of Y axis cut X axis propagation, it becomes possible to generate, with small power, an elastic surface wave having larger energy. Consequently, the consumption of power by the optical wavelength filter can be decreased considerably.

Figure 1:
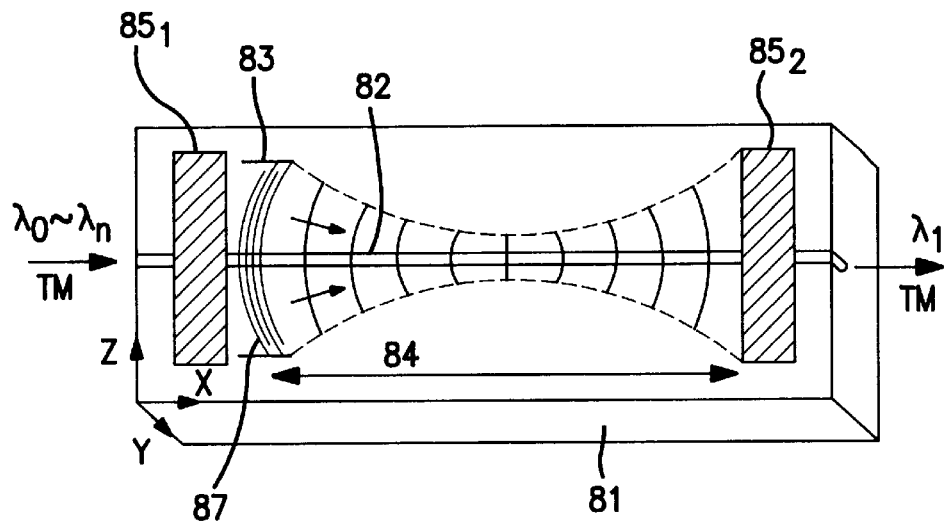
FIG. 1 is a plan showing a structure of a conventional optical wavelength filter.
Figure 3:
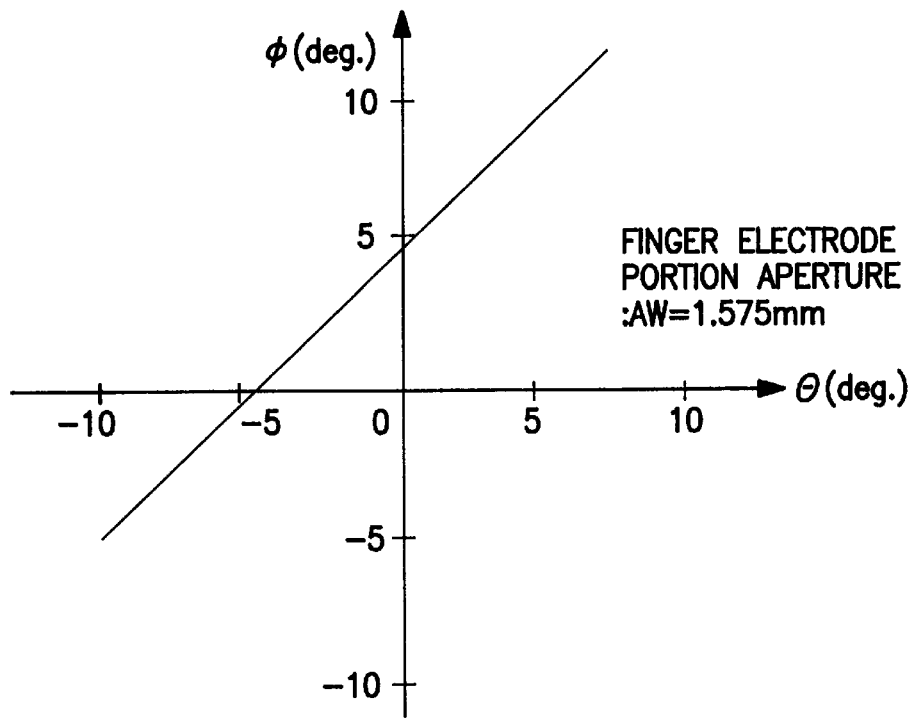
FIG. 3 is a graph showing the relation of a propagation angle of an elastic surface wave with reference to a tilt angle of a unit finger electrode portion of the optical wavelength filter shown in FIG. 2.
Figure 4:
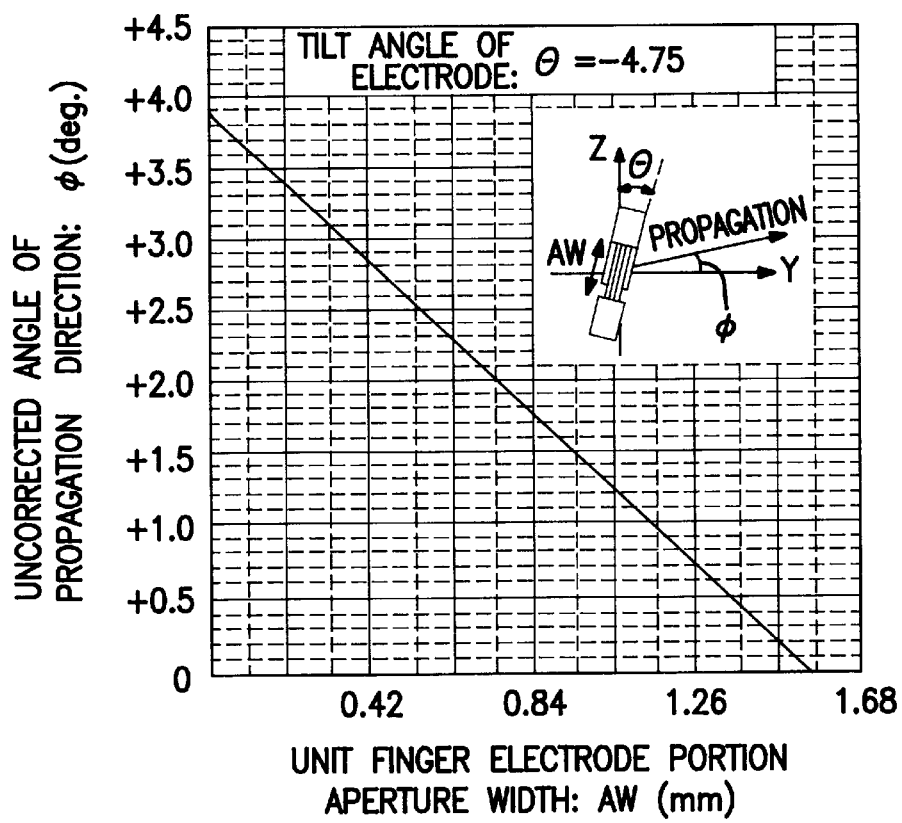
FIG. 4 is a graph showing the relation of the propagation angle of the elastic surface wave with reference to aperture width of a unit finger electrode portion of the optical wavelength filter shown in FIG. 2.

Now, a tilt angle and length (aperture width) of each of the unit finger electrode portions 18 can be determined, for example, referring to FIG. 3 and FIG. 4.

The propagation direction of each elastic surface wave shown in FIG. 3 and FIG. 4 depends on the tilt angle and length (aperture width) of unit finger electrode portion 18. Therefore, the characteristic of the propagation angle φ° of the elastic surface wave with reference to the tilt angle θ° of unit finger electrode portion 18 is line-approximated according to equation φ=a×θ+b based on the graph shown in FIG. 3, and then tilt a (=0.5 to 1.5) and an intercept b (=3 to 12°) are calculated from the graph shown in FIG. 4, respectively, to determine a provisional tilt angle of each of the unit finger electrode portions 18.

Next, an optical wavelength filter having each unit finger electrode portion 18 disposed with this provisional angle is prepared and the tilt angle of each of the unit finger electrode portions 18 is corrected by measuring the filter characteristic to determine the tilt angle of each of the unit finger electrode portions 18.

Figure 5:
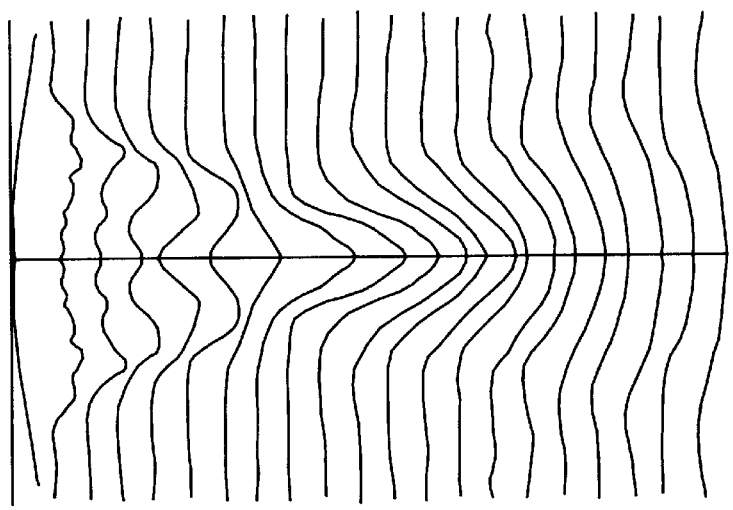
FIG. 5 is a plan showing the elastic surface wave of the optical wavelength filter shown in FIG. 2.
Figure 6:
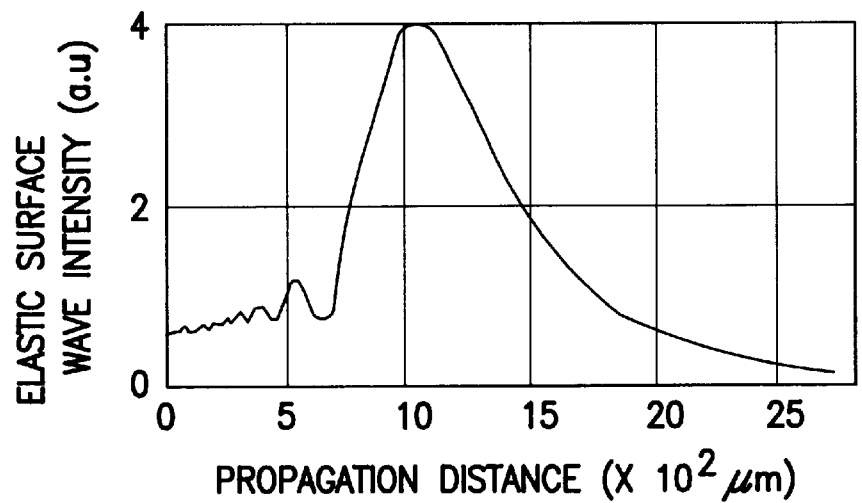
FIG. 6 is a graph showing the energy distribution of the elastic surface wave shown in FIG. 5 illustrated along the optical waveguide.
Figure 7:
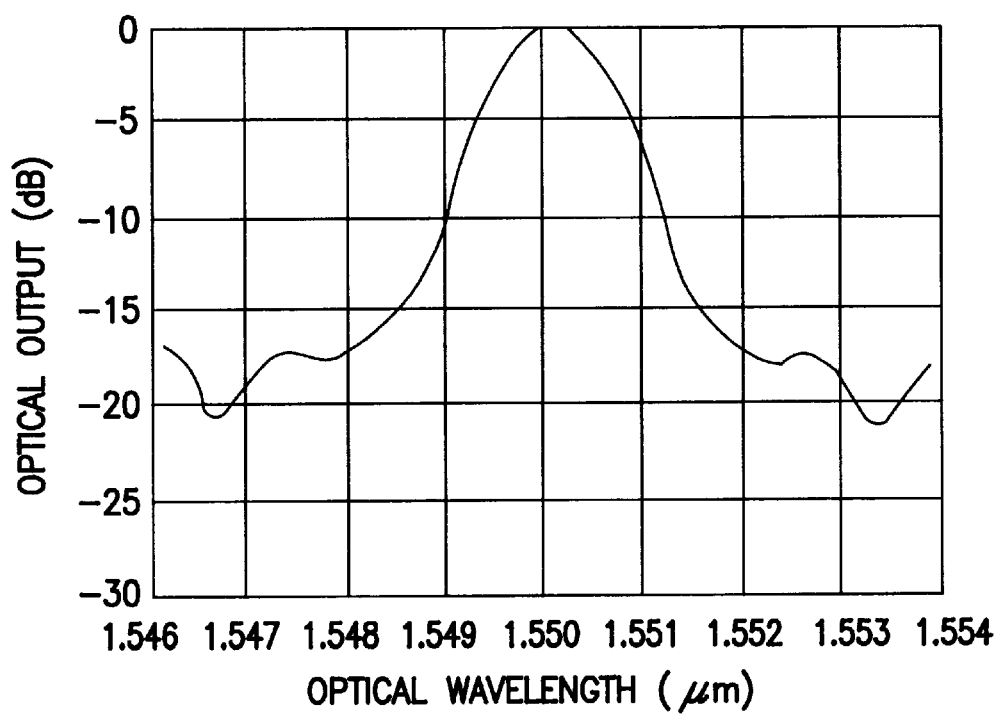
FIG. 7 is a wavelength (frequency) characteristic view showing the output characteristic of the optical wavelength filter illustrated in FIG. 2.

As shown in FIG. 5 and FIG. 6, since the energy of the elastic surface wave of the optical wavelength filter of the present embodiment is concentrated in interaction area 14, a weighting method is actually applied for controlling the acoustooptic effect. The output characteristic of an optical wavelength filter like this shows the decreased value in the sidelobe level, as shown in FIG. 7.

Figure 8:
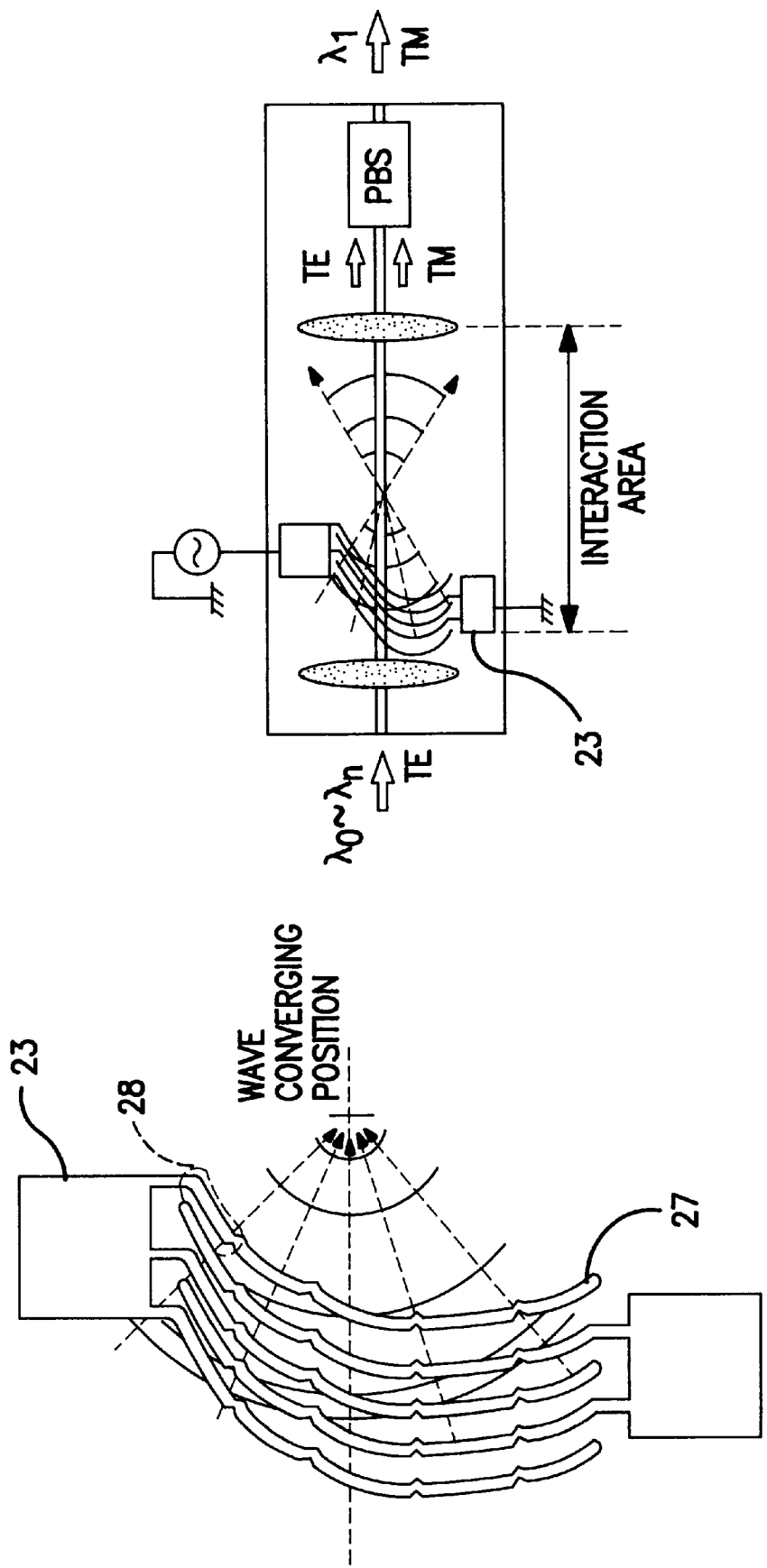
FIG. 8 is a plan showing a structure of a second embodiment of the optical wavelength filter of the present invention.

As shown in FIG. 8, in the optical wavelength filter of a second embodiment of the present invention, in the same way as the first embodiment, each finger electrode portion 27 constituting elastic surface wave excitation electrode 23 is divided into a plurality of unit finger electrode portions 28, and each of the unit finger electrode portions 28 are arranged to have, in addition to an inclination for disposing each finger electrode portion 27 in a circular arc shape, an angle for correcting the deflection of the propagation direction of the elastic surface wave so that the elastic surface wave converges at a desired position. Also, at the same time, unit finger electrode portions 28 are smoothly connected with respective neighboring unit finger electrode portions 28 without having any difference in step. As for the other structure, since it is the same as that of the first embodiment, the explanation thereof is omitted.

Since each joint between similar unit finger electrode portions 18 of the first embodiment has a difference in grade as shown in FIG. 2, the difference in grade may cause a further deflection in the elastic surface wave. In the present second embodiment, unit finger electrode portions 28 are smoothly jointed with each other without having a difference in grade in order to eliminate further deflection. With the optical wavelength filter of this structure, in the same way as the first embodiment, the elastic surface wave excited by elastic surface wave excitation electrode 23 converges at the desired position, and hence if a crystal having deflection in the propagation direction is employed as a substrate, the energy distribution of the elastic surface wave can be made to agree with a predetermined function, thereby decreasing the sidelobe level of the filter output.

Next, a method of manufacturing the optical waveguide and the elastic surface wave excitation electrode of the optical wavelength filter shown in the above first and second embodiments will be described.

First, a manufacturing method of the optical waveguide will be described.

First apply a photoresist on substrate 11 composed of a lithium niobate crystal of X axis cut Y axis propagation, then form a resist pattern by an exposure technique having a linear gap of 7 µm in width remained for an optical waveguide. Then, a titanium thin film of 110 nm thick is deposited thereon by means of a sputtering method.

Next, apply a lift-off treatment by using an organic solvent such as acetone to form an optical waveguide pattern with a titanium thin film.

This optical waveguide pattern receives a thermal diffusion treatment at 1050° C., 8 hours in an oxygen atmosphere to form single mode titanium-doped optical waveguide 11.

Further, the optical waveguide is formed to be from 6 to 10 µm in width, 60 to 150 nm in film thickness, receiving a thermal diffusion treatment at 950 to 1100° C.

Next, a method of manufacturing an elastic surface wave excitation electrode will be described.

A space between each finger electrode portion of the elastic surface wave excitation electrode is selected so as to satisfy the transform condition from TE polarization to TM polarization at the wavelength of 10 to 50 µm. For example, when the wavelength of the light is 1.55 µm, the space between each finger electrode portion becomes about 21 µm.

Now, it is assumed that finger electrode portions are in five pairs, aperture width is 1575 µm and each finger electrode portion is divided into 10 unit finger electrode portions. Each unit finger electrode portion is disposed having an angle (−1.4 to −7.8°) for correcting the deflection in the propagation direction of the elastic surface wave so that the elastic surface wave converges at a point 13.65 mm apart from one finger electrode portion. Further, a position for each unit finger electrode portion is selected so that the distance from each unit finger electrode portion position to the elastic surface wave converging position becomes equal (13.65 mm) for all of them in a respective finger electrode portion.

After determining the position and the tilt angle of each unit finger electrode portion in this way, a resist pattern on a substrate is formed by the exposure technique that uses a gap in a shape of the elastic surface wave excitation electrode, then an aluminum thin film of 150 nm thick is deposited thereon by means of a sputtering method, and successively a lift-off treatment is applied to form the elastic surface wave excitation electrode.

While preferred embodiments of the present invention have been described using specific terms, such description is for illustrative purposes only, and it is to be understood that changes and variations may be made without departing from the spirit or scope of the following claims.

What is claimed is:

1. An optical wavelength filter for transforming a light of a particular wavelength in a first linear polarization into another light in a second linear polarization, comprising a substrate;

an optical waveguide formed near a surface of the substrate, the optical waveguide having a first end to which the light in the first linear polarization inputs and a second end from which the light in the second linear polarization outputs; and a reed screen type electrode for generating an elastic surface wave composed of a plurality of finger electrode portions and formed on the first end side of the optical waveguide, wherein said plurality of finger electrode portions formed in a circular arc shape are disposed each having an angle for correcting the deflection of the propagation direction of said elastic surface wave so that said elastic surface wave converges at a desired position, wherein said plurality of finger electrode portions are composed of a plurality of unit finger electrode portions each having an angle for correcting the deflection of the propagation direction of said elastic surface wave, each of said unit finger electrode portions being disposed at an equal distance from said desired position.

2. The optical wavelength filter according to claim 1, wherein said substrate is made of a lithium niobate crystal of X axis cut Y axis propagation.

3. An optical wavelength filter for transforming a light of a particular wavelength in a first linear polarization into another light in a second linear polarization, comprising a substrate;

an optical waveguide formed near a surface of the substrate, the optical waveguide having a first end to which the light in the first linear polarization inputs and a second end from which the light in the second linear polarization outputs; and a reed screen type electrode for generating an elastic surface wave composed of a plurality of finger electrode portions and formed on the first end side of the optical waveguide, wherein said plurality of finder electrode portions formed in a circular arc shape are disposed each having an angle for correcting the deflection of the propagation direction of said elastic surface wave so that said elastic surface wave converges at a desired position, wherein said plurality of finger electrode portions are composed of a plurality of unit finger electrode portions each having an angle for correcting the deflection of the propagation direction of said elastic surface wave, each of said unit finger electrode portions being connected with a neighboring unit finger electrode portion without having a difference in grade.

4. The optical wavelength filter according to claim 3, wherein said substrate is made of a lithium niobate crystal of X axis cut Y axis propagation.

5. An optical wavelength filter comprising:

a substrate with an X axis cut and a Y axis light propagation direction;

an optical waveguide at a surface of said substrate in the Y axis direction, said waveguide having a first end for receiving a first light and a second end for emitting a second light that has been filtered by the optical wavelength filter; and a reed screen type electrode adjacent said first end for generating surface acoustic waves, said electrode comprising plural finger electrodes that are nested together and that are each a different distance from a predetermined position on said optical waveguide, each of said plural finger electrode having plural segments that are joined end-to-end so that each said finger electrode is continuous and extends across said optical waveguide, wherein each of said segments is arcuate and has a segment propagation direction toward the predetermined position, and wherein for each of said finger electrodes each of said segments has a different propagation direction toward the predetermined position that is defined by a length of the segment and a tilt angle of the segment from the Y axis direction.

6. The filter of claim 5, wherein for each of said finger electrodes each of said segments is the same distance from the predetermined position.

7. The filter of claim 5, wherein for each of said finger electrodes each of said segments is a different distance from the predetermined position.

* * * * *